Nov. 15, 1932.  G. S. MESSINGER  1,887,817
CENTRIFUGAL THRESHING MACHINE
Filed June 11, 1928    2 Sheets-Sheet 1
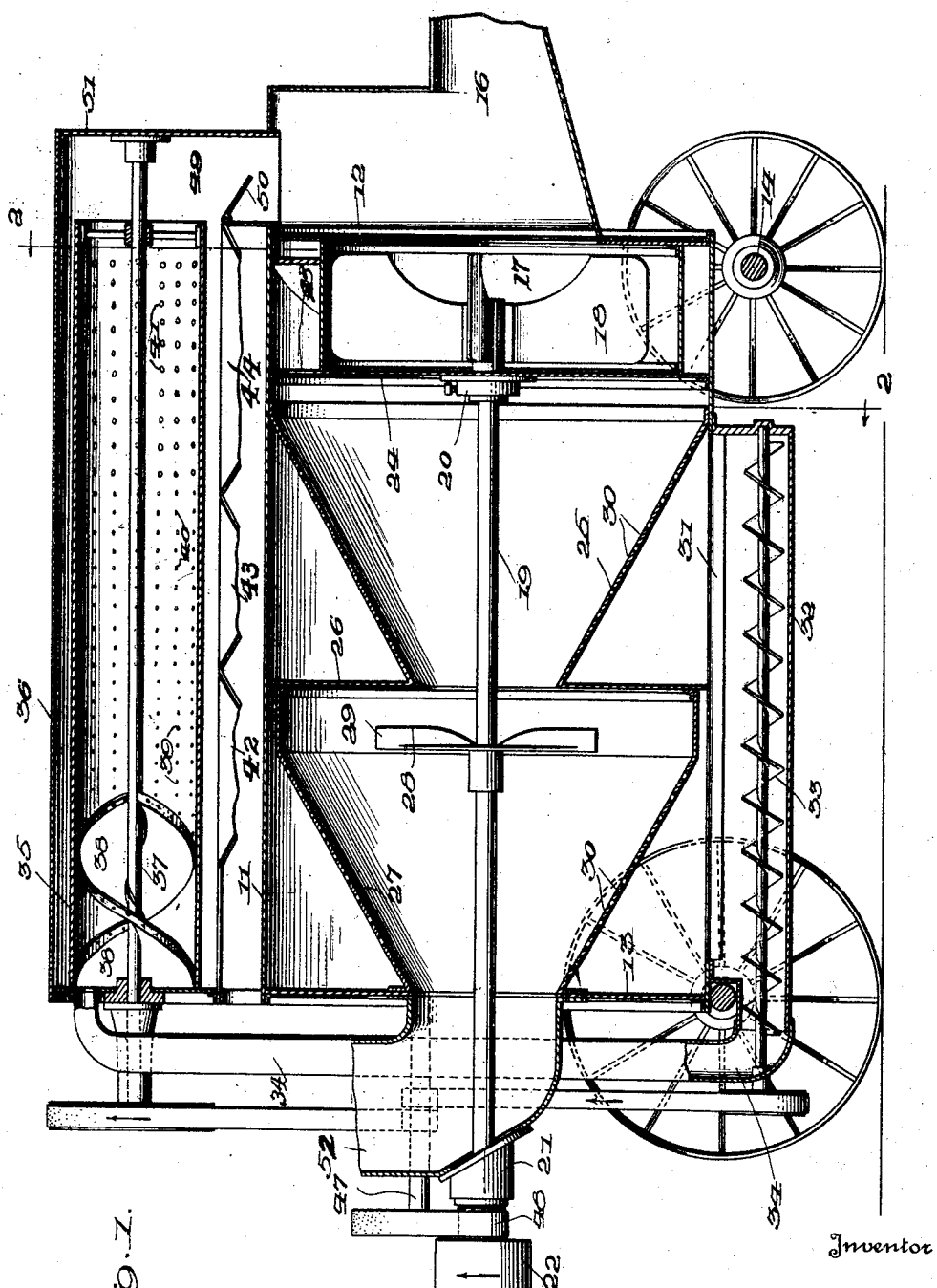

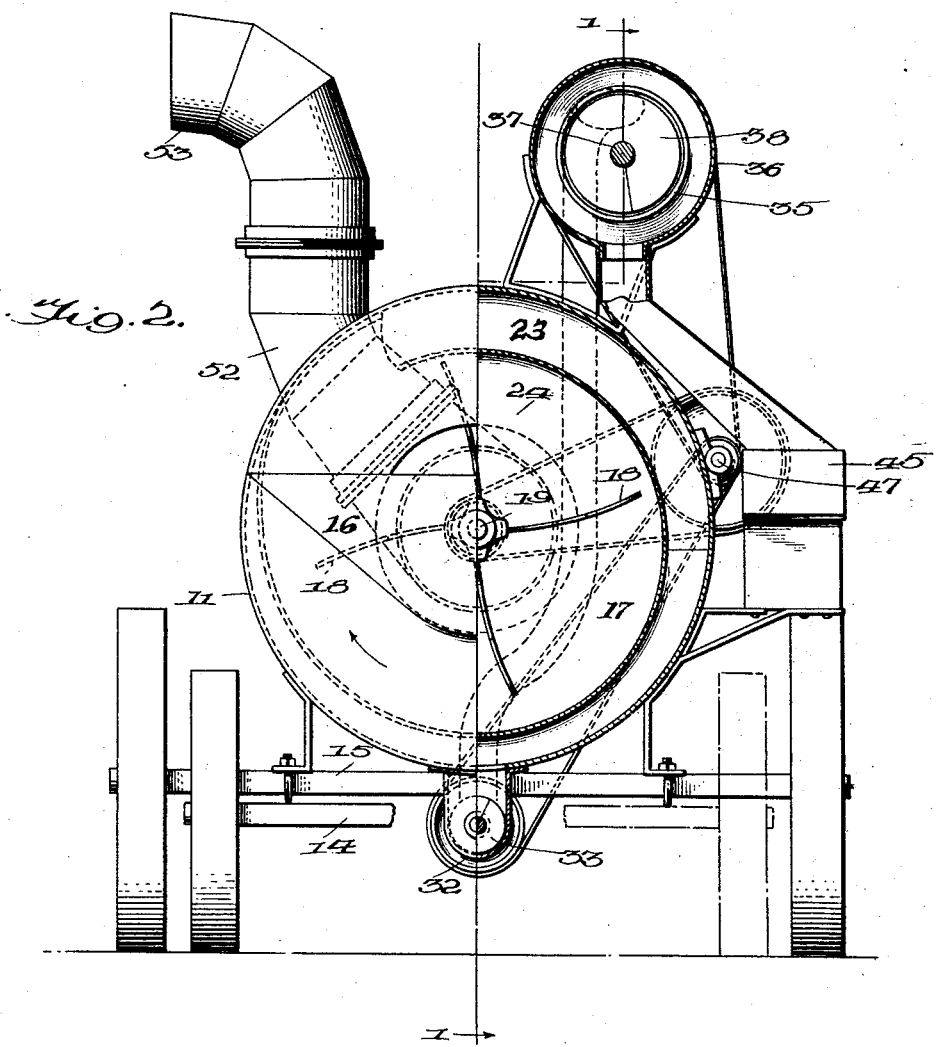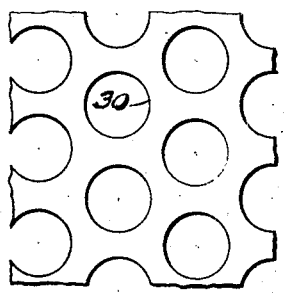

Patented Nov. 15, 1932

1,887,817

UNITED STATES PATENT OFFICE

GEORGE S. MESSINGER, OF TATAMY, PENNSYLVANIA

CENTRIFUGAL THRESHING MACHINE

Application filed June 11, 1928. Serial No. 284,601.

The invention aims to provide a compact and effective portable device for threshing out the grain and separating it from the straw, and for cleaning the grain and separating the whole kernels from the broken ones.

The invention further aims to economize power by eliminating all reciprocating or vibratory parts and balancing the rotary parts, thereby enabling the construction to be lightened and cheapened without sacrifice of strength or wearing qualities.

Further aims and objects of the invention appear in connection wtih the description of the preferred embodiment illustrated in the accompanying drawings, wherein Fig. 1 is a longitudinal, vertical section of the machine taken on the line 1—1 in Fig. 2 in order to show the threshing drum and air cleaner in section each on its principal axis;

Fig. 2 is a part front elevation and part transverse section on the line 2—2 in Fig. 1; and Fig. 3 is a side view of a piece of the perforated sheet metal stationary cone for separating the grain from the straw.

The machine shown in the drawings comprises a cylindrical body 11 having its ends 12, 13, closed, and mounted on forward and rear wheeled axles 14, 15, the forward axle preferably being provided with a tongue and arranged to swivel to enable the machine to be drawn over the highways and fields. A trough shaped inclined chute or feeding hopper 16 is located at the front end of the machine, and discharges through a feeding hole in the front end wall 12 of the body into the fan compartment 17.

The fan 18 is mounted on a shaft 19, journalled in bearings 20, 21, carried by the end walls and driven by means of a pulley 22 from any convenient source of power, such as a portable engine or tractor. The fan chamber discharges through an opening 23 in the top of the inner wall 24 of the fan chamber into the big end of the first perforated cone 25, the shape and location of the opening being such as to give the discharge from the fan a whirling motion around the inside of the cone. A deflector vane (not shown) may be located in the top part of the fan chamber to assist in discharging the grain and straw from the fan through the opening 23.

The small end of the cone 25 discharges through a central opening in the middle wall 26 into the second perforated cone 27. A baffle disc 28 is arranged on the shaft 19 in line with the opening in the wall 26 to intercept grain and straw discharging into the second perforated cone 27, and this baffle disc is furnished with beater arms 29 to maintain the whirling motion of the straw given it by the fan 18 and deflector vane or opening 23.

The perforations 30 (see Fig. 3) in the cones 25, 27, are large enough to permit the kernels of grain, dirt, chaff and some small pieces of straw, etc., to pass through into the surrounding spaces in the enclosing body, from which they fall down through an opening 31 running lengthwise of the body into the screw conveyor trough 32, whence they are pushed along by the conveyor screw 33 to the outlet duct 34 at the rear end of the body.

The blast of air from the fan 18 through the perforations 30 into the conveyor trough is sufficient to carry the grain, dirt, etc., up through the duct 34 into the cleaning drum 35 which is disposed lengthwise of the machine in a cylindrical casing 36 mounted on top of the body 11.

The cleaning drum 35 is rotatably mounted on a shaft 37, suitably journalled in the end walls of the cylindrical casing 36, and provided with a spiral deflector 38 for causing the materials to swirl through it against its periphery. The cleaning drum has a series of perforations of varying size for screening the grain, the finest holes being placed nearest the entering end for permitting dust and fine dirt to escape. There are three perforated sections, the first having small holes 39 for permitting grass seed and dirt to be thrown out; the next section has medium size holes 40 for permitting broken grains to be separated out; and the third section has full size holes 41 for the good grain.

Hoppers and chutes 42, 43 and 44 are disposed below the screen sections of small, medium and full size holes, for collecting the grass seed, broken kernels and good grain, respectively. These chutes may lead to suitable bags suspended from the holders 45 that are supported on brackets on one side of the body of the machine, for collecting the different products from the cleaner.

The cleaning drum and deflector or screw 38 are rotated together, thereby maintaining continuous whirling movement of the grain and other materials through it, and the drum shaft 37 and conveyor shaft 33 are preferably driven by belts from a center shaft 47, journalled on one side of the body, and in turn driven by a belt from a pulley 48 on the main shaft 19.

The sticks and pieces of straw that are carried through the cleaning drum 35 are deposited through a chute 49 into the feed hopper at the intake to the fan chamber. An adjustable damper 50 is arranged in the outlet chute 49 to control the flow of air through the conveyor 32, uptake 34, and cleaning drum 35 to insure sufficient velocity to carry the materials into the cleaner, and then drop them there upon the screen sections, and carry off such as do not pass through any of the screen openings. The end cover 51 of the outlet chute is removable to enable the cleaning drum to be inspected and cleaned.

The outlet duct 52 from the second perforated cone 27 is provided with a rotatable elbow pipe section 53 at its end for depositing the straw to one side or the other of the machine, as desired.

In the operation of the device, it is found that such kernels as are not separated from the straw in the fan 18 are knocked out by the whirling in the first cone 25, and the few that pass through into the second cone 27, hit the disc 28 and the beaters 29 fling them against the perforated wall of the second cone 27. This action knocks out all the grain remaining in the heads and none escapes with the straw.

The machine may be equipped with a gasoline engine and hauled through the field behind a reaper and thresh the grain as it is cut, or the operating parts may be mounted directly upon a tractor and operated by power from the latter as it moves through the field. Various modifications of the mounting and driving means will occur to those skilled in the art to suit different conditions of use.

The hopper 12, fan chamber 17, threshing cones 25—27, grain trough 32, duct 34, and cleaning drum 35 are all connected together in a closed circuit so that the currents of air circulate through them. By reason of this arrangement there is a minimum wastage of grain that is not threshed and cleaned in the first threshing operation within the cones 25—27, and the lighter particles of chaff, which may adhere to the grain and pass through the perforations of the cones 25–30 are free to be loosened from the kernels in the cleaning compartment and carried away in the relatively strong current of air that is recirculated through the main threshing chambers, and thence discharge through the outlet chute 52.

The invention is not restricted to the embodiment shown in the drawing, but what I claim is as follows:

1. A threshing machine comprising a body having rotary vanes for beating the unthreshed grain and causing it to be carried in a whirling air stream through the separating means, a converging wall provided with perforations in its periphery through which the kernels are discharged, and an outlet for the straw through the apex of said wall.

2. A centrifugal threshing machine comprising a fan and casing having its spiral discharge outlet at the periphery of the latter, an axial inlet into the fan chamber for unthreshed grain, a conical separator chamber communicating with said spiral discharge and provided with perforations in its converging wall for the grain kernels to pass through, an axial straw outlet from said chamber on the side opposite the fan casing, and means for rotating said fan to cause the unthreshed grain and a current of air to be discharged into the separator chamber in a swirling stream to throw the grain kernels against said perforated wall, and emit the straw from the axial outlet.

3. A centrifugal threshing machine comprising a plurality of perforated conical drums, the small end of one drum discharging into the large end of the next drum, a fan having an axial inlet and a peripheral discharge at the entering side of the first drum, a beater at the entering side of the second drum, said beater being provided with a baffle adjusting the exit opening of said first drum.

4. In a centrifugal threshing machine, a perforated conical drum, a casing surrounding said drum, a rotating fan device at one end of said casing and discharging tangentially into said drum for giving a whirling motion to unthreshed grain and delivering it forcibly against the inclined walls of said drum, and means operated by the blast from said fan for removing grain passing into said casing.

5. A centrifugal threshing machine comprising a fan and casing having its outlet at the periphery of the latter, an inlet into the fan chamber for unthreshed grain, a separator chamber having a conical cross-section converging toward its outlet and provided with perforations in its peripheral wall for the grain kernels to pass through, a straw outlet opening from said chamber on the side opposite the inlet, and means for rotating said fan to cause the unthreshed grain to be discharged circumferentially into the separator chamber in a swirling stream to throw the grain kernels against said perforated wall and carry the straw through said outlet.

6. A centrifugal threshing machine comprising a plurality of perforated conical drums, the small end of one drum discharging into the large end of the next drum, an air circulating device and grain beater at the entering side of the first drum for forcing the material through the drums in a whirling stream, a grain beater at the entering side of the second drum, said beater being provided with a baffle adjacent the exit opening of said first drum, and a straw outlet from the last drum.

7. A centrifugal threshing machine, having a perforated drum, a grain collecting casing surrounding said drum, a feeding and beating device including a rotating fan at the entrance of, and discharging circumferentially into said drum for giving a whirling motion to unthreshed grain under air pressure entering said drum, and means operated by the pressure from said fan for removing grain passing into said casing and separating it from the chaff.

8. A threshing machine comprising a body having a conical separator and a rotary fan arranged for beating the unthreshed grain and discharging the kernels and straw circumferentially in a whirling air stream through the conical separator, the latter being provided with perforations in its periphery through which the kernels are discharged, means for collecting said kernels and discharging them free of chaff, and an outlet for the straw through the apex of said conical separator.

9. A threshing machine having a main drum enclosing a separator, a fan at the inlet end of said drum for beating and fanning the unthreshed grain to loosen the kernels and form a current of air upon which they are borne through the separator in a tangential whirling stream, exit means for the straw, exit means for the kernels in the periphery of the separator, an auxiliary drum and a rotary screen mounted therein, said screen having sized openings for classifying the kernels and separating out the dirt, and an air duct connecting the separator drum and auxiliary drum for conveying the kernels to the latter, said main and auxiliary drums forming with said air duct a closed circuit whereby the current of air set up by said fan causes circulation of said kernels from said main drum through said air duct to said auxiliary drum.

10. In a threshing machine, in combination, a hopper, a threshing drum, a grain receiving and a grain cleaning drum, means connecting said threshing, grain receiving and grain cleaning drums in a closed circuit, said threshing drum including unitary means for setting up a whirling current of air pressure of relatively high velocity within said machine and through said closed circuit, for first effecting separation of the grain from the straw in said threshing cylinder and then conveying the grain to the cleaning drum, and cleaning and grading said grain while maintaining said current of air through said drum.

11. In a threshing machine, in combination, a hopper, a threshing drum, a grain receiving and a grain cleaning drum, an air and straw outlet from said threshing cylinder, means for connecting said threshing, receiving and cleaning drums in a closed circuit including a conveyor between said receiving drum and cleaning drum, said threshing drum including unitary means for setting up a whirling current of air pressure of relatively high velocity within said machine, for first effecting separation of the grain from the straw in said threshing cylinder and then conveying the grain to the cleaning drum, and cleaning and grading said grain while maintaining said current of air through said drum.

12. In a threshing system, the combination of a circular perforated threshing drum having sectional inclined screening walls, a grain receiver and rotary cylindrical grain cleaner and grader, means for connecting said drum, receiver and grader in a closed circuit, said threshing drum being provided with means for passing a circuitous current of air pressure of high velocity through said system adapted to carry the unthreshed grain through said threshing drum and separate the grain from the straw by a beating action against the screening walls, and then to convey said grain from the receiver to the cleaner and grader, and to subject the grain to a cleaning and grading action therein in the presence of said current of air.

In testimony whereof, I have signed my name to this specification.

GEORGE S. MESSINGER.

CERTIFICATE OF CORRECTION.

Patent No. 1,887,817.  November 15, 1932.

GEORGE S. MESSINGER.

It is hereby certified that error appears in the printed specification of the above numbered patent requiring correction as follows: Page 2, line 109, claim 3, for "adjusting" read "adjacent"; and that the said Letters Patent should be read with this correction therein that the same may conform to the record of the case in the Patent Office.

Signed and sealed this 27th day of December, A. D. 1932.

(Seal)

M. J. Moore,
Acting Commissioner of Patents.